(12) United States Patent
Wu et al.

(10) Patent No.: US 7,764,605 B2
(45) Date of Patent: Jul. 27, 2010

(54) METHODS AND SYSTEMS FOR MEASUREMENT-BASED CALL ADMISSION CONTROL IN A MEDIA GATEWAY

(75) Inventors: Ju Wu, Richardson, TX (US); Yen Shei, Plano, TX (US); Samuel Olive Perry, Garland, TX (US); Christopher Jay Ouellette, McKinney, TX (US)

(73) Assignee: GENBAND Inc., Plano, TX (US)

(*) Notice: Subject to any disclaimer, the term of this patent is extended or adjusted under 35 U.S.C. 154(b) by 1010 days.

(21) Appl. No.: 11/032,562

(22) Filed: Jan. 10, 2005

(65) Prior Publication Data

US 2006/0077962 A1   Apr. 13, 2006

Related U.S. Application Data

(60) Provisional application No. 60/616,651, filed on Oct. 7, 2004.

(51) Int. Cl.
   *G01R 31/08* (2006.01)
(52) U.S. Cl. .............. 370/230; 370/232; 370/352; 370/353; 370/354; 370/356; 379/221.05; 379/221.06; 379/221.07; 709/225; 709/226; 709/227; 709/228; 709/229
(58) Field of Classification Search ......... 370/230–232, 370/351–356; 379/221.05–221.07; 709/225–229
   See application file for complete search history.

(56) References Cited

U.S. PATENT DOCUMENTS

| | | | |
|---|---|---|---|
| 4,984,264 A | 1/1991 | Katsube | |
| 6,173,322 B1 | 1/2001 | Hu | |
| 6,339,594 B1 * | 1/2002 | Civanlar et al. | 370/352 |
| 6,426,955 B1 * | 7/2002 | Dalton et al. | 370/401 |
| 6,584,110 B1 * | 6/2003 | Mizuta et al. | 370/401 |
| 6,775,269 B1 | 8/2004 | Kaczmarczyk et al. | |

(Continued)

FOREIGN PATENT DOCUMENTS

WO   WO 02/49279 A2   6/2002

(Continued)

OTHER PUBLICATIONS

International Search Report and Written Opinion of the International Searching Authority corresponding to PCT application No. PCT/US05/35890 dated Jul. 20, 2006.

(Continued)

*Primary Examiner*—Hemant Patel
(74) *Attorney, Agent, or Firm*—Jenkins, Wilson, Taylor & Hunt, P.A.

(57) ABSTRACT

Methods and systems for measurement-based call admission control in a media gateway are disclosed. A request for establishing a new voice-over-IP (VoIP) call for sending and receiving voice over IP packets in a media gateway is received. The request indicates a required bandwidth for the new call. Bandwidth utilization of at least one Internet protocol (IP) network interface for sending and receiving voice over IP packets in the media gateway is determined. The media gateway determines whether to admit the new VoIP call based on the determined requested bandwidth for the new call and the determined bandwidth utilization for at least one of the IP network interfaces.

30 Claims, 10 Drawing Sheets

U.S. PATENT DOCUMENTS

| | | | |
|---|---|---|---|
| 6,775,280 B1 | 8/2004 | Ma et al. | |
| 6,904,017 B1 * | 6/2005 | Meempat et al. | 370/238 |
| 6,907,004 B1 * | 6/2005 | Ramsey et al. | 370/235 |
| 6,914,883 B2 | 7/2005 | Dharanikota | |
| 6,928,069 B2 * | 8/2005 | Nakanishi | 370/352 |
| 6,944,150 B1 | 9/2005 | McConnell et al. | |
| 6,965,562 B2 * | 11/2005 | Tuomi | 370/230 |
| 6,976,087 B1 * | 12/2005 | Westfall et al. | 709/238 |
| 7,002,973 B2 | 2/2006 | MeLampy et al. | |
| 7,028,092 B2 | 4/2006 | MeLampy et al. | |
| 7,046,683 B1 | 5/2006 | Zhao | |
| 7,072,303 B2 | 7/2006 | MeLampy et al. | |
| 7,133,923 B2 | 11/2006 | MeLampy et al. | |
| 7,151,781 B2 | 12/2006 | MeLampy et al. | |
| 7,236,483 B2 * | 6/2007 | Yeom | 370/352 |
| 7,320,123 B2 | 1/2008 | Govindarajapuram et al. | |
| 2002/0083185 A1 * | 6/2002 | Ruttenberg et al. | 709/232 |
| 2002/0181401 A1 * | 12/2002 | Hagirahim et al. | 370/236 |
| 2003/0041146 A1 | 2/2003 | Davis et al. | |
| 2003/0091028 A1 * | 5/2003 | Chang et al. | 370/352 |
| 2004/0002864 A1 * | 1/2004 | Yeom | 704/270.1 |
| 2005/0007954 A1 * | 1/2005 | Sreemanthula et al. | 370/229 |
| 2005/0041648 A1 | 2/2005 | Bharatia et al. | |
| 2005/0081059 A1 | 4/2005 | Bandini et al. | |
| 2005/0111382 A1 | 5/2005 | Le et al. | |
| 2005/0185657 A1 | 8/2005 | Karanassos | |
| 2006/0077962 A1 | 4/2006 | Wu | |
| 2006/0098577 A1 | 5/2006 | MeLampy et al. | |
| 2006/0250959 A1 | 11/2006 | Porat | |
| 2007/0019544 A1 | 1/2007 | Smith et al. | |
| 2007/0027975 A1 | 2/2007 | Tai et al. | |
| 2007/0036151 A1 | 2/2007 | Baeder | |
| 2007/0076603 A1 | 4/2007 | MeLampy et al. | |
| 2007/0116043 A1 | 5/2007 | MeLampy et al. | |
| 2007/0211716 A1 | 9/2007 | Oz et al. | |
| 2008/0049787 A1 | 2/2008 | McNaughton et al. | |
| 2008/0159136 A1 | 7/2008 | Mallesan | |
| 2008/0162720 A1 | 7/2008 | Gulati et al. | |

FOREIGN PATENT DOCUMENTS

| | | |
|---|---|---|
| WO | WO 02/49315 A2 | 6/2002 |
| WO | WO 02/49316 A2 | 6/2002 |
| WO | WO 02/58349 | 7/2002 |
| WO | WO 2004/071027 A1 | 8/2004 |

OTHER PUBLICATIONS

Notification of Transmittal of the International Search Report and the Written Opinion of the International Searching Authority, or the Declaration for International Application No. PCT/US05/36381 (May 15, 2007).

Notice of Allowance and Fee(s) Due for U.S. Appl. No. 11/690,348 (Jul. 9, 2009).

Non-Final Official Action for U.S. Appl. No. 11/690,348 (Nov. 13, 2008).

Notification of Transmittal of the International Search Report and the Written Opinion of the International Searching Authority, or the Declaration for International Application No. PCT/US07/66627 (May 21, 2008).

Communication pursuant to Rules 109 and 110 EPC for European Application No. 05807585.4 (Jul. 19, 2007).

Notification of European Publication Number and Information on the Application of Article 67(3) EPC for European Application No. 05807585.4 (Jun. 13, 2007).

Yenra, "VOIP: Session Border Controller," http://www.yenra.com/session-border-controller/, 2 pages (Oct. 18, 2004).

"Session Admission Control: Interactive Communication SLAs over Skinny Pipes," Acme Packet, Inc., 14 pages (2002).

Interview Summary for U.S. Appl. No. 11/694,398 (Sep. 9, 2009).

Official Action for U.S. Appl. No. 11/694,398 (Mar. 24, 2009).

Final Official Action for U.S. Appl. No. 11/694,398 (Oct. 24, 2008).

Official Action for U.S. Appl. No. 11/694,398 (Jun. 6, 2008).

* cited by examiner

METHODS AND SYSTEMS FOR MEASUREMENT-BASED CALL ADMISSION CONTROL IN A MEDIA GATEWAY

RELATED APPLICATIONS

This application claims the benefit of U.S. Provisional Application No. 60/616,651 entitled "Media Gateway Features", filed Oct. 7, 2004, the disclosure of which is incorporated herein by reference in its entirety.

TECHNICAL FIELD

The subject matter described herein relates to communications and more particularly to call admission control in a media gateway.

BACKGROUND

In modern telephony networks, media switching and call control functionality are separated. Call control, which includes setting up and tearing down calls and maintaining call state machines, is performed by a network entity referred to as a media gateway controller (MGC). Media stream switching, which includes switching media packets between input and output ports and converting the media packets into the appropriate formats for the sending and receiving parties, is performed by a media gateway (MG). Media gateway controllers communicate call control information to media gateways via a media gateway control protocol. Typical media gateway control protocols, such as MGCP and MEGACO, include commands for communicating information about each endpoint of a session to the media gateway and instructing the media gateway as to how to process packets to be delivered to each endpoint.

FIG. 1 is a schematic diagram illustrating voice sessions between media gateways 100, 102, 104, and 106 interconnected through an IP network 108. Media gateways 100, 102, 104, and 106 may be connected through IP network 108 via multiple paths through a series of next-hop routers. Multiple bidirectional voice sessions may be set up between any two or more of media gateways 100, 102, 104, and 106. As voice packets are received at a media gateway (ingress packets) or exit the media gateway (egress packets), the particular session that a packet belongs to is identified for proper delivery and/or processing of the packet. The terms "session" and "call" are used interchangeably herein.

FIG. 2 is a schematic diagram illustrating an exemplary media gateway 200. Referring to FIG. 2, media gateway 200 includes a control manager 202, a resource manager 204, a packet switch fabric 206, voice servers 208, and network interfaces 210. Each voice server 208 contains voice processing resources for processing VoIP and TDM voice streams. For example, each voice server 208 may include codecs, VoIP, ATM, and TDM chips, and digital signal processing resources for processing VoIP streams. A detailed description of exemplary resources that may be found in voice server 208 can be found in commonly assigned, co-pending U.S. patent application Ser. No. 10/676,233, the disclosure of which is incorporated herein by reference in its entirety.

Control manager 202 of media gateway 200 controls the overall operation of media gateway 200 and communicates with media gateway controller 212 to set up and tear down calls. Resource manager 204 of control manager 202 allocates new voice sessions to incoming calls. For example, resource manager 204 may assign one of voice servers 208 to a session. Voice servers 208 are each assigned individual IP addresses and are each reachable through packet switch fabric 206 via any of network interfaces 210. Multiple sessions may be processed by the same voice server 208. Furthermore, multiple sessions may be established between a given network interface 210 and a given voice server 208 through the packet switch fabric 206. The traffic rate on a given interface 210 should not exceed the maximum available bandwidth to avoid degrading the voice quality of calls. In order to maintain an expected quality of service (QoS) for existing calls and to provide a suitable QoS for newly admitted calls in media gateway 200, call admission control (CAC) is employed. Call admission control considers criteria, such as available bandwidth, to determine whether or not a new voice call should be accepted.

One problem with conventional call admission control techniques is that they do not accurately determine available bandwidth. For example, some conventional call admission control techniques allocate a peak bandwidth that the call will require to each new call, as determined during call setup, and this peak bandwidth is subtracted from the available bandwidth. This is partly due to the fact that the impact on available bandwidth of voice encoding techniques that are commonly used in VoIP transmissions, such as compression and silence suppression technologies, is difficult to determine and may result in a non-deterministic traffic rate for each call. Accurately determining the traffic rate at the media gateway is important to achieve better bandwidth utilization while maintaining an expected quality of service for calls handled by the media gateway.

Accordingly, a need exists for measurement-based call admission control in a media gateway.

SUMMARY

In one aspect of the subject matter disclosed herein, a method is disclosed for measurement-based call admission control in a media gateway. A request for establishing a new voice-over-IP (VoIP) call for sending and receiving voice over IP packets in a media gateway is received. The request indicates a required bandwidth for the new call. Bandwidth utilization of at least one Internet protocol (IP) network interface for sending and receiving voice over IP packets in the media gateway is determined. The media gateway determines whether to admit the new VoIP call based on the determined required bandwidth for the new call and the determined bandwidth utilization for at least one of the IP network interfaces.

In another aspect of the subject matter disclosed herein, a system is disclosed for measurement-based call admission control in a media gateway. The system includes at least one network processor associated with at least one IP network interface in a media gateway, each network processor including logic configured to measure bandwidth utilization of its IP network interface, and a control manager for receiving the measured bandwidth utilization for each of the network interfaces, for receiving a request for establishing a new VoIP call in the media gateway and for determining whether to admit the new call to the media gateway based on bandwidth required for the new call and the bandwidth utilization measured for at least one of the IP network interfaces.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION OF THE INVENTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, or device. More specific examples (a non exhaustive list) of the computer-readable medium can include the following: a portable computer diskette, a random access memory (RAM), a read-only memory (ROM), an erasable programmable read-only memory (EPROM or Flash memory), and a portable compact disc read-only memory (CDROM).

Thus, the subject matter disclosed herein can be embodied in many different forms, and all such forms are contemplated to be within the scope of what is claimed. Any such form of embodiment may be referred to herein as "logic configured to" perform a described action.

Figure 1:
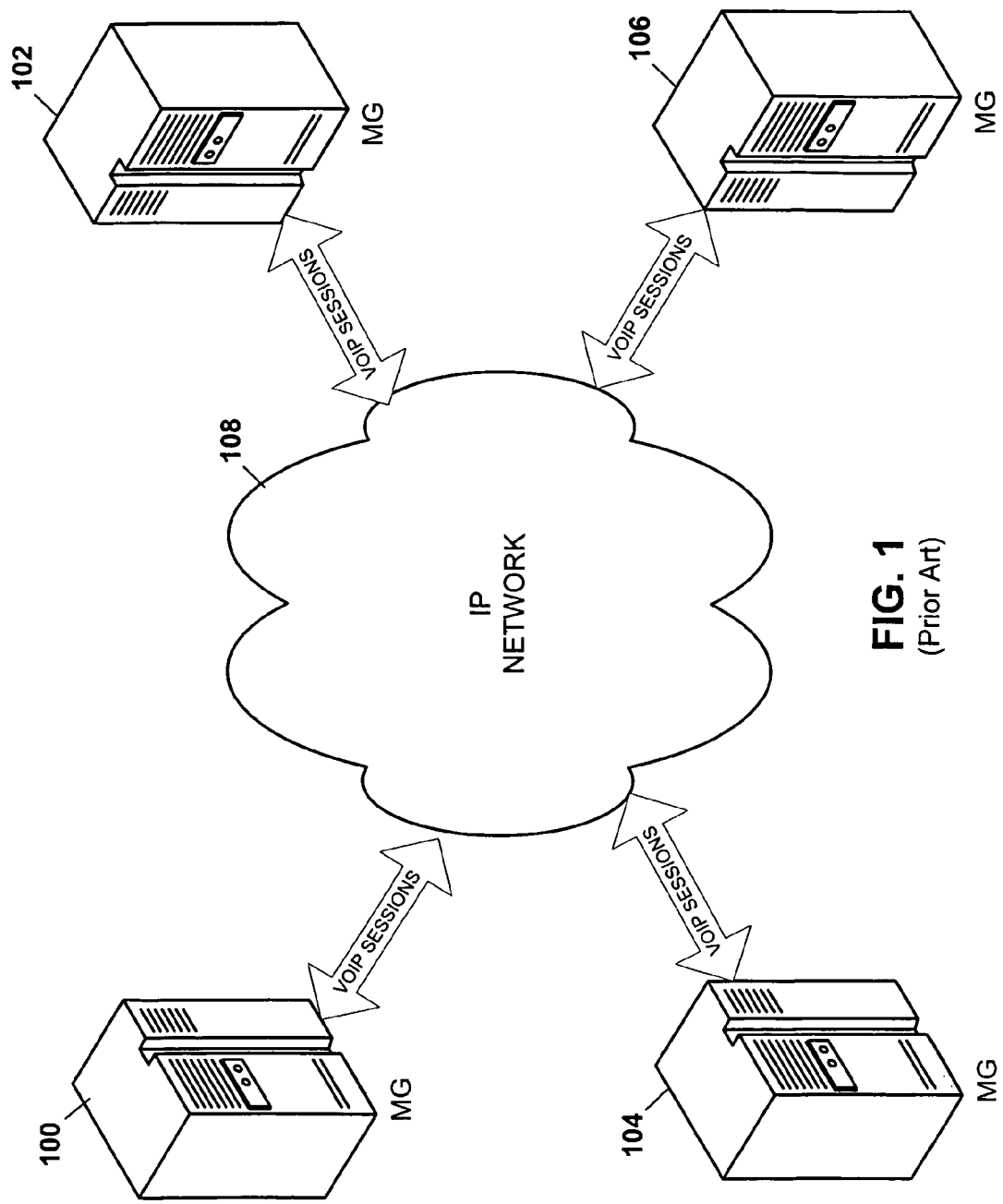
FIG. 1 is a schematic diagram illustrating voice sessions between media gateways interconnected through an IP network.
Figure 2:
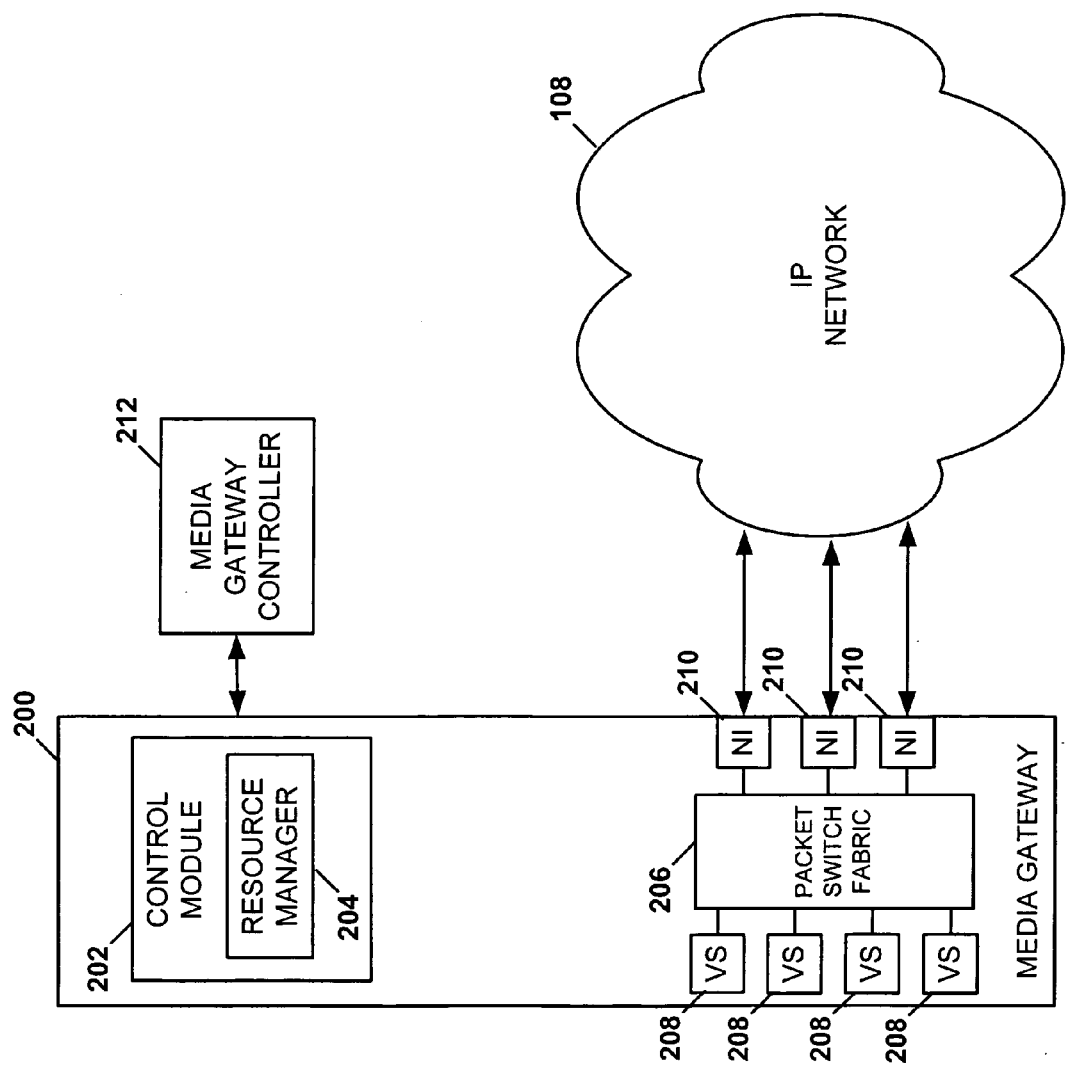
FIG. 2 is a schematic diagram illustrating a media gateway.
Figure 3:
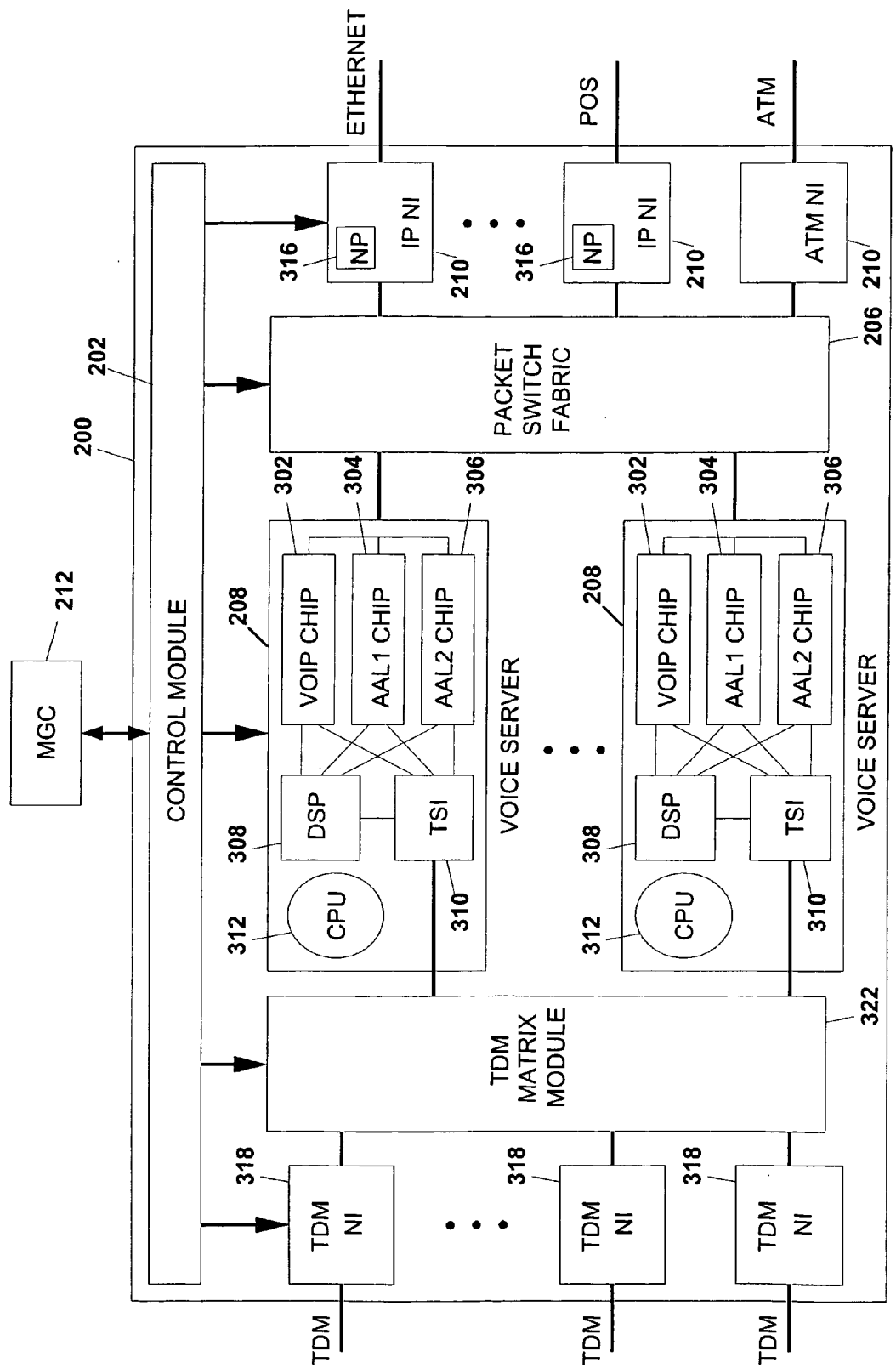
FIG. 3 is a schematic diagram illustrating an exemplary internal architecture for a media gateway.

FIG. 3 is a schematic diagram illustrating an exemplary internal architecture for media gateway 200 in more detail. In FIG. 3, media gateway 200 includes voice servers 208, which include various voice chips, including VoIP chips 302, voice-over-AAL1 chips 304, and voice-over-AAL2 chips 306. In addition, each voice server 208 includes some digital signal processors 308 (e.g., voice transcoders, echo cancellers, conference bridges, etc.), a time slot interconnection (TSI) 310, and a central processing unit (CPU) 312.

In the illustrated example, each voice chip 302 implements one or more VoIP protocols, such as Real time Transmission Protocol (RTP). Each voice chip 304 implements ATM Adaptation Layer 1 (AAL1) functions. Each voice chip 306 implements ATM Adaptation Layer 2 (AAL2) functions. DSP 308 provides transcoding, echo cancellation and other payload-transformation functions. TSI 310 makes on-demand connections between VoIP chip channels, TDM matrix channels, and DSPs. CPU 312 controls the overall operation of each voice server 208.

In addition to a plurality of voice servers 208, media gateway 200 includes a plurality of network interfaces 210. Each network interface 210 implements network layer functions and packet forwarding functions, such as IP forwarding functions. In the illustrated example, different network interfaces are provided to connect to external Ethernet, Packet-Over-SONET (POS), ATM, and MPLS networks. Each IP network interface 210 includes a network processor 316 for implementing the various functions.

In addition to packet-based network interfaces 210, media gateway 200 may also include TDM network interfaces 318. TDM network interfaces 318 send and receive voice frames from external TDM networks. TDM network interfaces 318 may implement any suitable physical layer protocols for sending and receiving voice frames over TDM links. For example, each TDM network interface 318 may terminate one or more TDM voice trunks.

In order to switch media packets between network interfaces 210 and voice servers 208, media gateway 200 includes a packet switch fabric 206. Packet switch fabric 206 routes packets between voice servers 208 and network interfaces 210 under the control of control manager 202. As discussed above, packet switch fabric 206 may connect every network interface 210 to every voice server 208. Exemplary operations that may be performed at a voice server 208 may include segmentation and reassembly (SAR), echo cancellation, transcoding, DTMF detection, DTMF generation, announcement, conference bridging, Internet Fax, and law enforcement.

In addition to packet switch fabric 206, media gateway 200 may also include a TDM matrix module 322 for switching traffic that is carried in each TDM timeslot. TDM matrix module 322 is also controlled by control manager 320. Control manager 202 may communicate with media gateway controller 212 to dynamically allocate logical and physical resources for each session.

In operation, control manager 202 receives a request for a new call. The request may be generated by media gateway controller 212 in response to receiving a call setup message associated with a new call. The call setup message may be an ISUP IAM message, a PRI SETUP message, a SIP INVITE message, or any other suitable type of call setup message for initiating a call. Control manager 202 determines based on call setup parameters and other available bandwidth usage information within media gateway 200 whether media gateway 200 has adequate available bandwidth to support the new call, as will be discussed further below.

Figure 4:
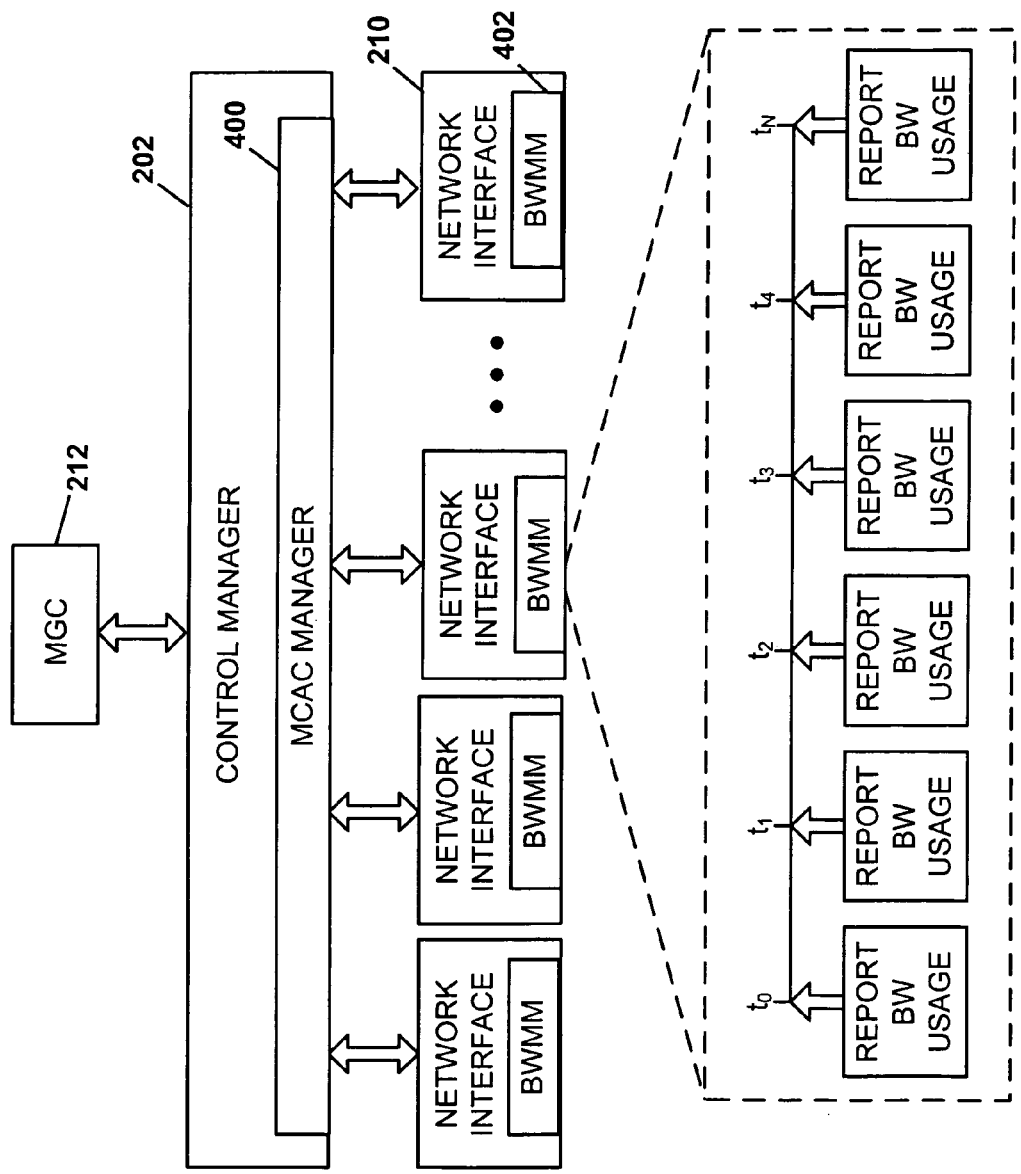
FIG. 4 is a schematic diagram illustrating bandwidth usage reporting within media gateway according to an aspect of the subject matter disclosed herein.

FIG. 4 is a schematic diagram illustrating bandwidth usage reporting within media gateway 200 according to an aspect of the subject matter disclosed herein. Control manager 202 includes a measurement-based call admission control manager (MCAC) 400 that communicates with network interfaces 210 to determine the bandwidth usage of each network interface 210. MCAC 400 may be implemented in any logic configured to perform the associated actions described herein. Each network interface 210 includes a bandwidth measurement module (BWMM) 402 having logic configured to measure bandwidth usage for its respective network interface 210. BWMM 402 may be part of network processor 316 for the network interface 210. As shown in FIG. 4, each network interface 210 may report bandwidth usage at time intervals $t_0, t_1, t_2 \ldots t_N$ as measured by its respective BWMM 402. Time intervals $t_0, t_1, t_2 \ldots t_N$ for reporting bandwidth usage may be periodic or aperiodic and/or may occur at predetermined or dynamically-determined times. BWMM 402 may measure the bandwidth usage for its respective network interface 210 continuously or at periodic or aperiodic time intervals. Note here that the measurements may be taken independently of reporting time intervals $t_0, t_1, t_2 \ldots t_N$ and are preferably taken as often or more frequently than the reporting time intervals. BWMM 402 can measure bandwidth usage using means known in the art. For example, BWMM 402 may count the number of packets handled by its respective network interface 210 over a predetermined time interval and compute an average bandwidth utilization measurement for the time interval.

MCAC manager 400 collects and stores in a memory (not shown) bandwidth usage information from network interfaces 210 for use in determining the bandwidth availability of each network interface 210. Control manager 202 uses the determined bandwidth availability to decide whether there is adequate bandwidth in call admission control decisions and to assign new calls to those network interfaces 210 that have adequate bandwidth.

Figure 5:
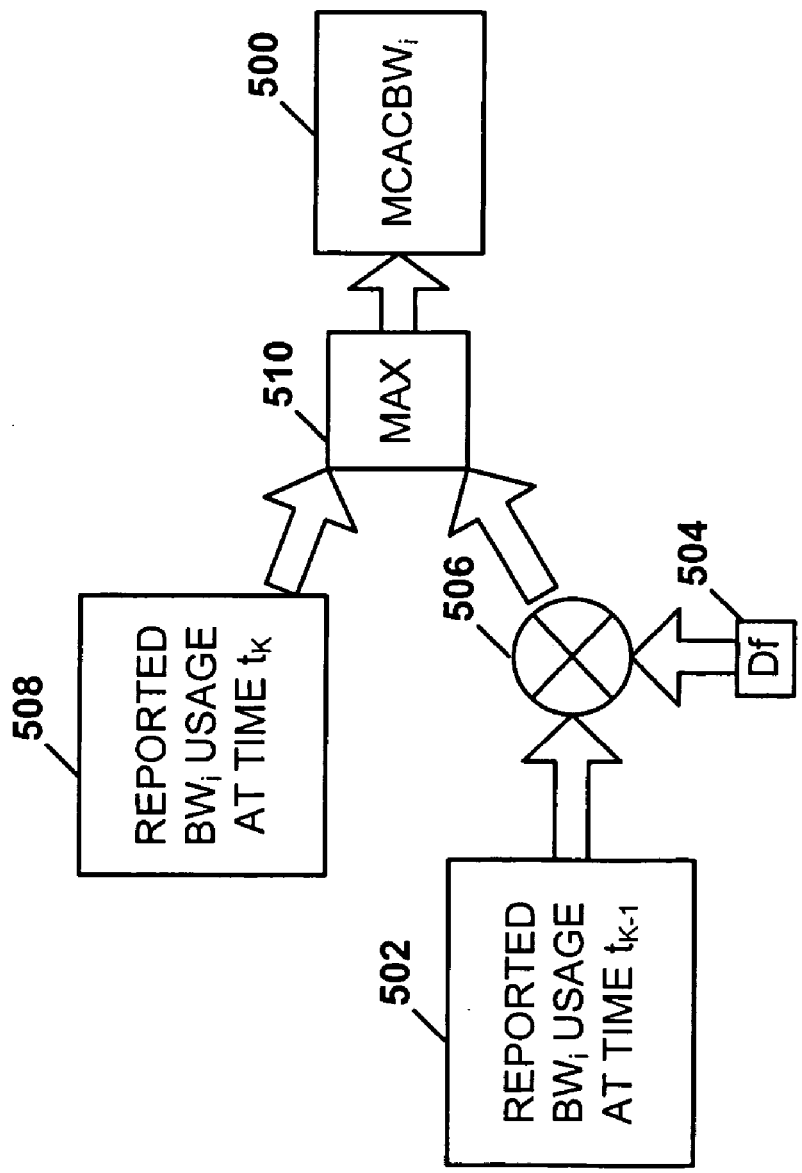
FIG. 5 is a schematic diagram illustrating a measurement-based call admission control algorithm for determining MCAC bandwidth usage according to an aspect of the subject matter disclosed herein.

FIG. 5 is a schematic diagram illustrating a measurement-based call admission control algorithm for determining MCAC bandwidth usage according to an aspect of the subject matter disclosed herein. The measurement-based call admission control algorithm may be carried out by logic configured to perform the described actions in control manager 202, such as a processor in MCAC manager 400, or elsewhere in control manager 202. With reference also to FIG. 4, MCAC manager 400 determines an MCAC bandwidth usage ($MCACBW_i$) 500 for a given network interface (i) 210 based on bandwidth usage reported by the network interface 210. A previously reported (at time $t_{K-1}$) bandwidth usage ($BW_i$) 502 is multiplied by a decay factor (Df) 504 in multiplier 506. A comparison is made between the products of previously reported (at time $t_{K-1}$) bandwidth usage 502 and currently reported bandwidth usage 508 and the highest value is selected in comparator/selector 510 to represent the MCAC bandwidth usage ($MCACBW_i$) 500 for the respective interface 210. Decay factor 504 is a value in the range $0 \leq Df \leq 1$ that is selected to mitigate the effects of a temporary and sudden drop in bandwidth usage that may happen to occur when the bandwidth usage is measured. For example, assume that the measured bandwidth usage for a given network interface 210 is reported at time $t_K$ to be 50% of the bandwidth usage as compared to bandwidth usage reported at time $t_{K-1}$ due to a sudden drop in bandwidth usage at the time the bandwidth usage was measured. This sudden drop in bandwidth usage may be temporary. For example, the drop may be caused by an interval of silence in an existing call. If this measurement were accepted as representing the current bandwidth usage, it is likely that the available bandwidth will be overestimated, since sudden drops in bandwidth of 50% on a network interface 210 are not likely. Assume also that decay factor 504 is selected by the network operator to be 0.9. Employing the measurement-based call admission control algorithm for determining MCAC bandwidth usage disclosed herein, the MCAC bandwidth usage ($MCACBW_i$) 500 would only drop by 10%, instead of 50%. Avoiding sharp MCAC bandwidth usage ($MCACBW_i$) 500 drops prevents overestimating bandwidth availability, which would otherwise result in control manager 202 over committing bandwidth to new calls and reducing voice quality of both existing and new calls. Equation 1 below represents the measurement-based call admission control algorithm for determining MCAC bandwidth usage in equation form.

$$MCACBW_i = \mathrm{MAX}(BW_i \text{ at time } t_K, BW_i \text{ at time } t_{K-1} * Df) \qquad (1)$$

Figure 6:
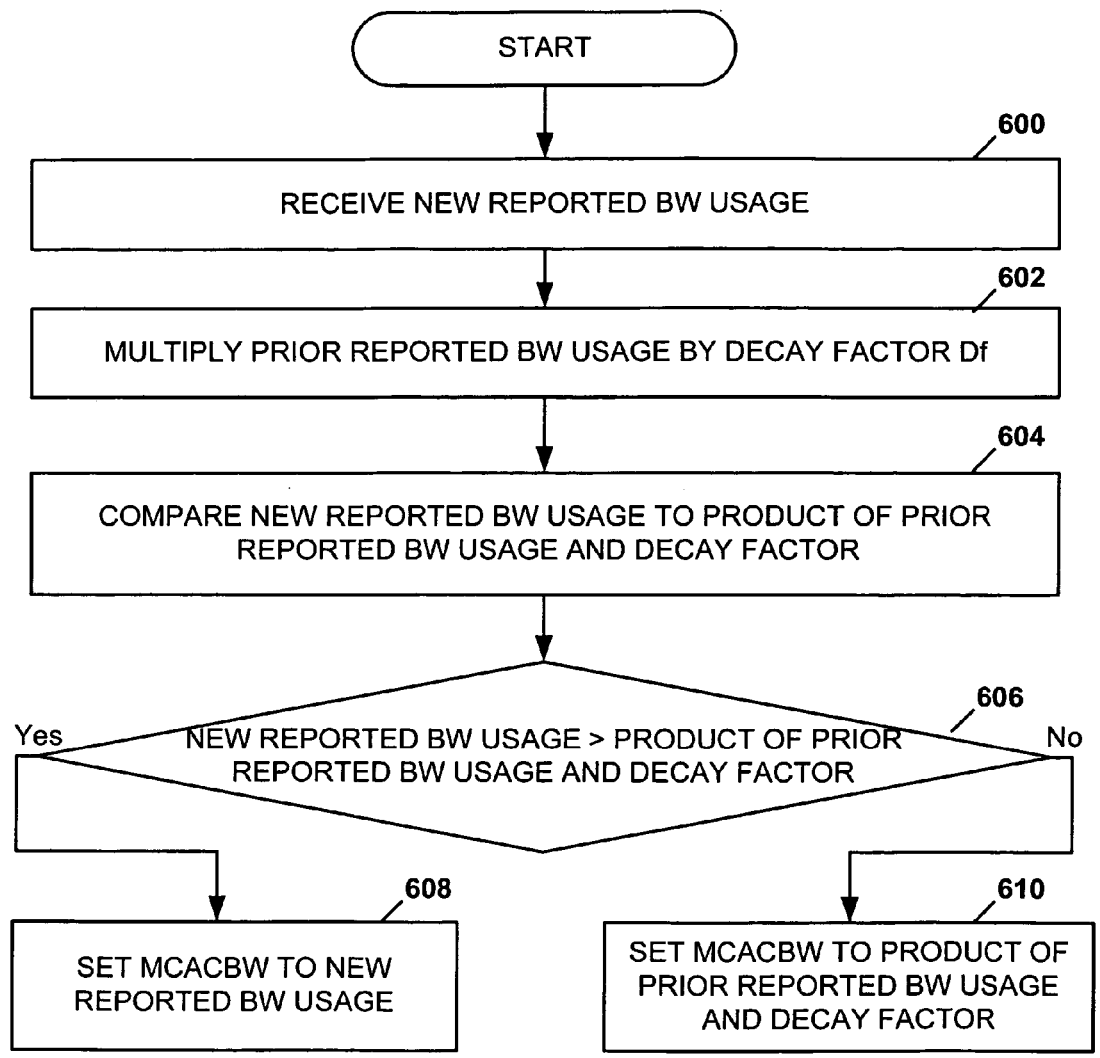
FIG. 6 is a flow chart illustrating a method for determining MCAC bandwidth usage according to an aspect of the subject matter disclosed herein.

FIG. 6 is a flow chart illustrating a method for determining MCAC bandwidth usage according to an aspect of the subject matter disclosed herein. In FIG. 6, a new reported bandwidth usage 508 is received at MCAC manager 400 from a respective network interface 210 in step 600. A previously reported bandwidth usage 502 for the same network interface 210 is multiplied by decay factor 504 in step 602 and the newly reported bandwidth usage 508 is compared to the product of the previously reported bandwidth usage 502 and the decay factor 504 in step 604. Responsive to the newly reported bandwidth usage 508 being greater than the product of the previously reported bandwidth usage 502 and the decay factor 504 in step 606, $MCACBW_i$ 500 is set to the new reported bandwidth usage 508 in step 608. Responsive to the newly reported bandwidth usage 508 not being greater than the product of the previously reported bandwidth usage 502 and the decay factor 504 in step 606, $MCACBW_i$ 500 is set to the product of the previously reported bandwidth usage 502 and the decay factor 504 in step 610.

Figure 7:
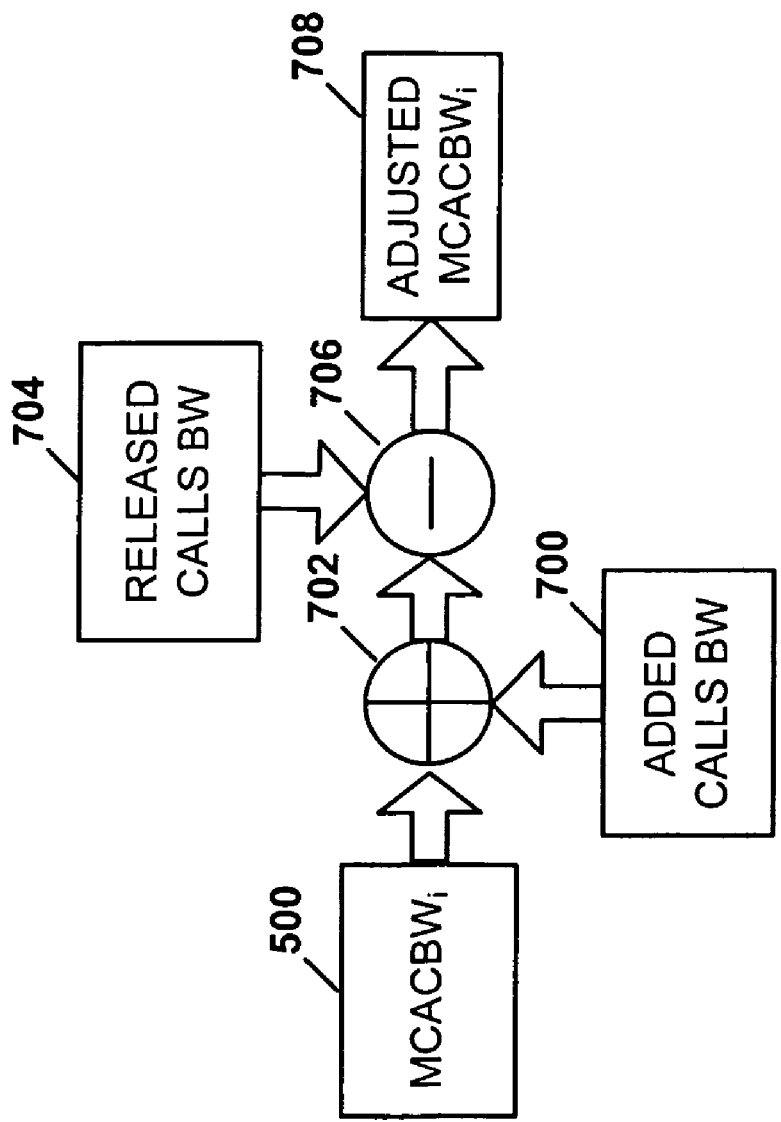
FIG. 7 is a schematic diagram illustrating a measurement-based call admission control algorithm for adjusting MCAC bandwidth usage according to another aspect of the subject matter disclosed herein.

FIG. 7 is a schematic diagram illustrating a measurement-based call admission control algorithm for adjusting MCAC bandwidth usage according to another aspect of the subject matter disclosed herein. Calculating $MCACBW_i$ 500 as described above provides control manager 202 a baseline bandwidth usage from which call admission control decisions can be made. $MCACBW_i$ 500, however, may be adjusted as calls are admitted and/or released between $MCACBW_i$ 500 calculations to provide a more accurate and near real time bandwidth usage information for call admission control decisions. In FIG. 7, the bandwidth of calls that are added 700 since the last $MCACBW_i$ 500 calculation is added in summer 702 and the bandwidth of calls that are released 704 is subtracted in subtractor 706 to adjust $MCACBW_i$ 500 to arrive at an adjusted $MCACBW_i$ 708. Accordingly, control manager 202 may maintain more accurate near real time bandwidth usage information for each network interface 210 to be used in call admission control decisions.

Figure 8:
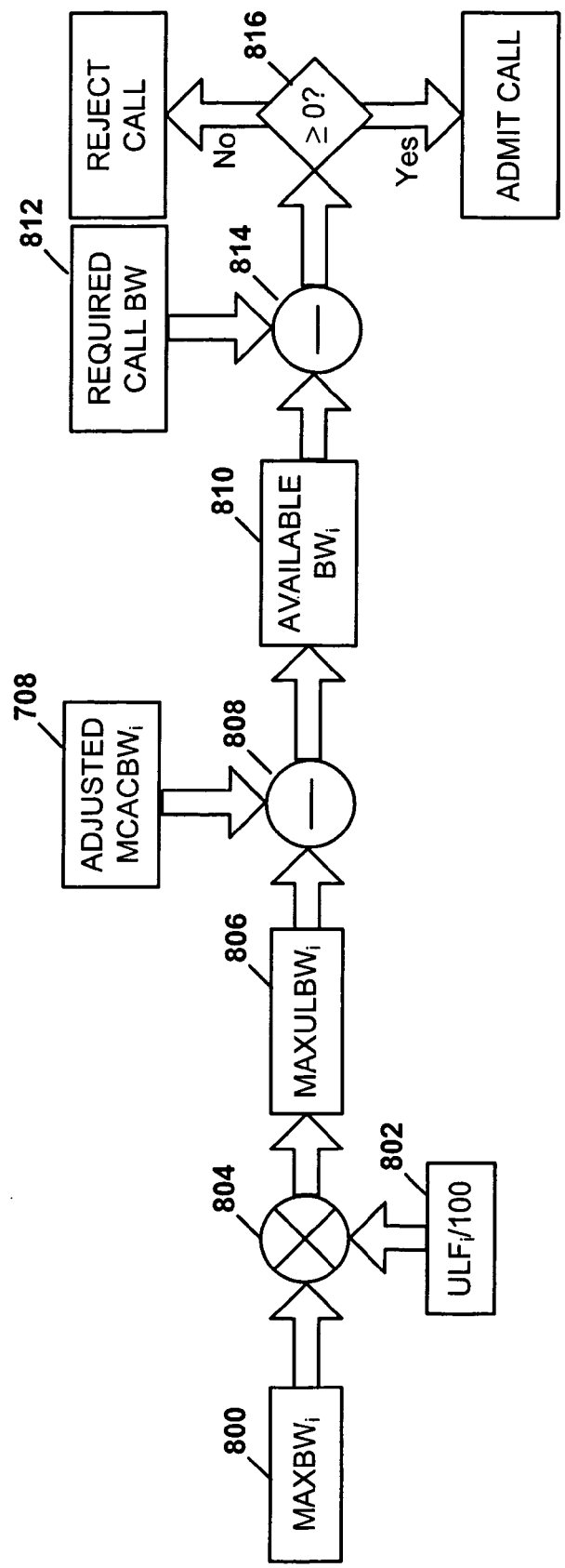
FIG. 8 is a schematic diagram illustrating a measurement-based call admission control algorithm for determining whether to admit or reject a call according to another aspect of the subject matter disclosed herein.

FIG. 8 is a schematic diagram illustrating a measurement-based call admission control algorithm for determining whether to admit or reject a call according to another aspect of the subject matter disclosed herein. In FIG. 8, a maximum possible bandwidth ($MAXBW_i$) 800 that a network interface 210 is capable of processing may be adjusted downward by multiplying a usage limit factor $ULF_i/100$ 802 in a multiplier 804. Usage limit factor 802 is set by a media gateway operator to allow network interfaces 210 to operate at a user-defined limited maximum bandwidth ($MAXULBW_i$) 806 that is less than the physical limits of the respective network interface 210. Alternatively, this calculation may be eliminated (or $ULF_i/100$ may be set to 1) and $MAXULBW_i$ 806 may be set equal to MAXBW$_i$ 800. In either case, adjusted MCACBW$_i$ 708 is subtracted from MAXULBW$_i$ 806 in subtractor 808 to determine an available bandwidth BW$_i$ 810 for the respective network interface 210.

During call setup between control manager 202 and media gateway controller 212, a required bandwidth 812 for a call is determined. Required bandwidth 812 may be provided by media gateway controller 212 and depends on call setup parameters such as encoding, required quality of service, compression, and the like. Once the required bandwidth 812 for a call is established, a comparison is made to the available bandwidth 810 of one or more network interfaces 210 to determine if any network interface has adequate available bandwidth 810 to support the call. For example, required bandwidth 812 may be subtracted from available bandwidth 810 in subtractor 814 and a determination 816 may be made as to whether the result is greater than zero. Responsive to the result being greater than or equal to zero, the call is admitted and assigned to the respective network interface 210 by control manager 202. Responsive to the result being less than zero, the call is rejected, i.e., the call is not assigned to the respective network interface 210 by control manager 202. In this case, other network interfaces 210 may be checked for available bandwidth. Equation 2 below represents the measurement-based call admission control algorithm for determining an available BW$_i$ (for deciding whether to admit or reject a call) in equation form.

$$\text{Available } BW_i = (MAXBW_i * ULF_i/100) - \text{adjusted } MCACBW_i \quad (2)$$

Figure 9:
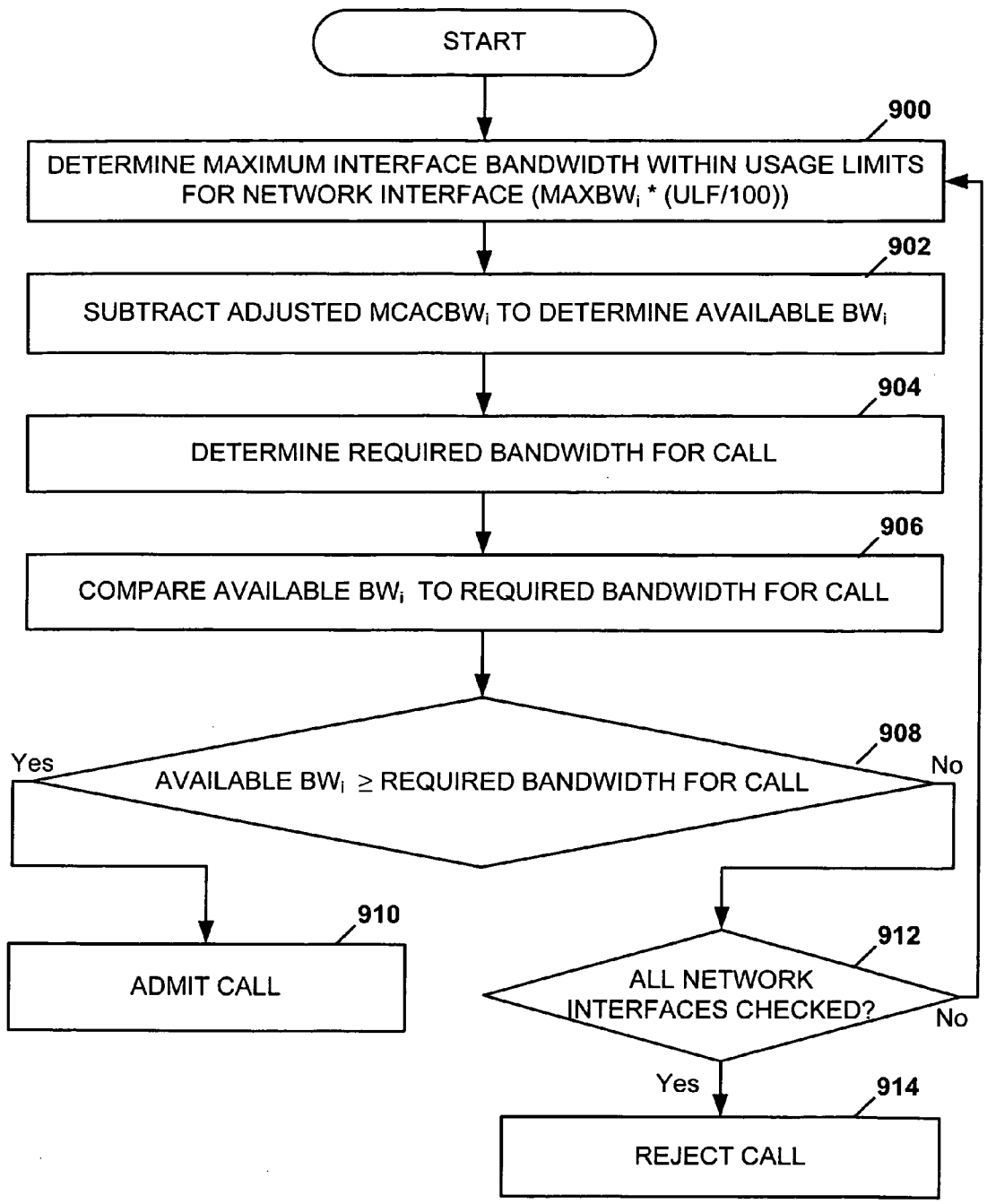
FIG. 9 is a flow chart illustrating a method for determining whether to admit or reject a call according to another aspect of the subject matter disclosed herein.

FIG. 9 is a flow chart illustrating a method for determining whether to admit or reject a call according to another aspect of the subject matter disclosed herein. Control manager 202 determines the maximum bandwidth within usage limits 806 for a respective network interface 210 in step 900. The adjusted bandwidth usage (adjusted MCACBW$_i$) 708 is subtracted in step 902 to determine available bandwidth 810. The required bandwidth 812 for a call is determined in step 904. The available bandwidth 810 is compared to the required bandwidth 812 for a call in step 906. Responsive to the available bandwidth 810 being greater than or equal to the required bandwidth 812 in step 908, the call is admitted and assigned to the respective network interface 210 in step 910. Responsive to the available bandwidth 810 not being greater than the required bandwidth 812 in step 908, control manager 202 determines whether all network interfaces 210 have been checked for available bandwidth 810 in step 912. Responsive to a determination that all network interfaces 210 have not been checked, control returns to step 900 and the next network interface 210 is checked. Responsive to a determination that all network interfaces 210 have been checked, the call is rejected in step 914.

Figure 10:
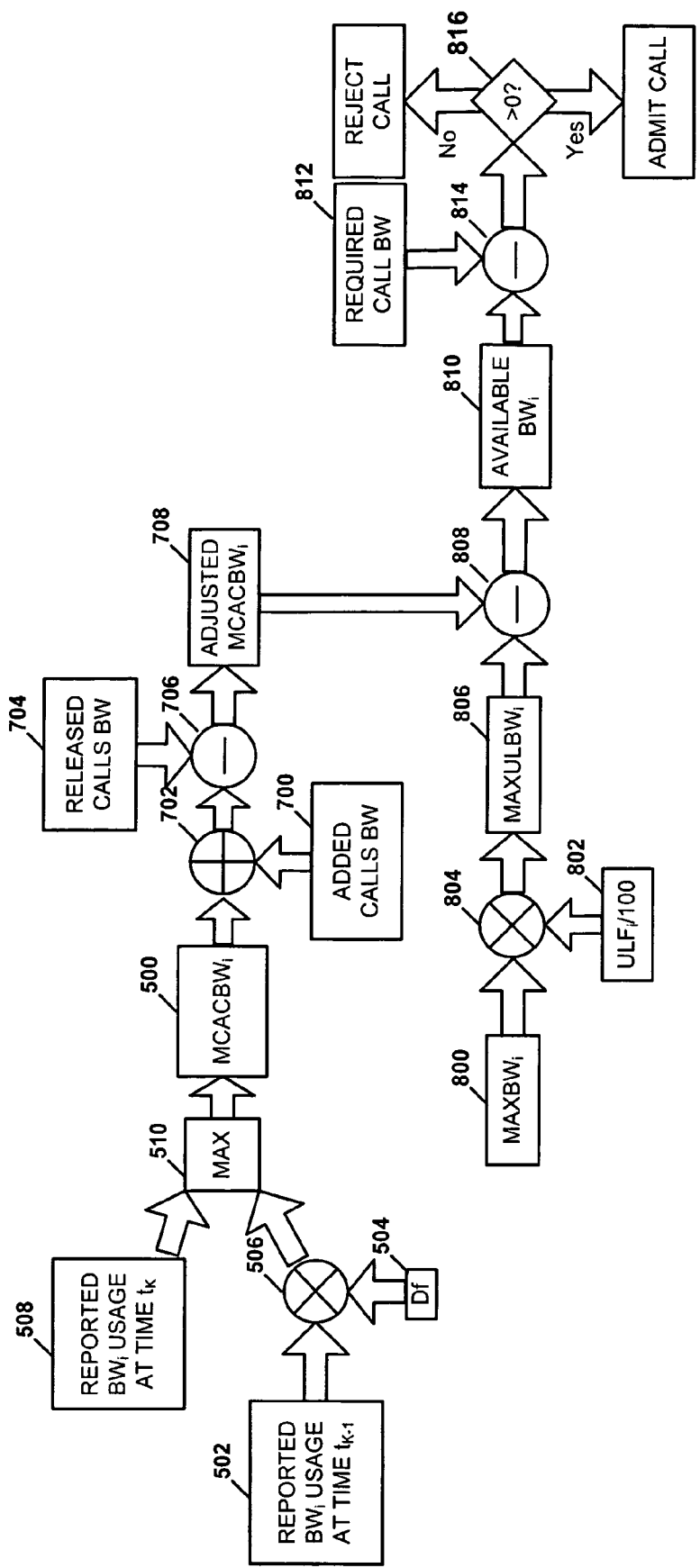
FIG. 10 is a schematic diagram illustrating a combined measurement-based call admission control algorithm according to an aspect of the subject matter disclosed herein.

FIG. 10 is a schematic diagram illustrating a measurement-based call admission control algorithm that combines the measurement-based call admission control algorithm for determining MCAC bandwidth of FIG. 5, the measurement-based call admission control algorithm for adjusting MCAC bandwidth usage of FIG. 7, and the measurement-based call admission control algorithm for determining whether to admit or reject a call of FIG. 8 into one measurement-based call admission control algorithm for determining whether to admit or reject calls. The respective above-mentioned different portions of the algorithm of FIG. 10 may operate at different times. That is, it is not necessary that the entire measurement-based call admission control algorithm of FIG. 10 be carried out each time a call admission decision is made and/or at the same time. For example, the portion the responding to the measurement-based call admission control algorithm for determining MCAC bandwidth of FIG. 5 may be carried out at periodic or aperiodic time intervals, while the portion corresponding to the measurement-based call admission control algorithm for adjusting MCAC bandwidth usage of FIG. 7 may be carried out at different periodic or aperiodic time intervals, or as calls are admitted or released. The portion corresponding to the measurement-based call admission control algorithm for determining whether to admit or reject a call of FIG. 8 may be carried out when media gateway 200 is considering setting up a new call, as would be expected.

In FIG. 10, MCAC manager 400 determines an MCAC bandwidth usage (MCACBW$_i$) 500 for a given network interface (i) 210 based on bandwidth usage reported by the network interface 210 and decay factor 504 as described above. MCACBW$_i$ 500 may then be adjusted as calls are admitted and/or released between MCACBW$_i$ 500 calculations to provide a more accurate and near real time bandwidth usage information for call admission control decisions by adding the bandwidth of calls that are added 700 since the last MCACBW$_i$ 500 calculation in summer 702 and subtracting the bandwidth of calls that are released 704 in subtractor 706 to adjust MCACBW$_i$ 500 and arrive at adjusted MCACBW$_i$ 708. A maximum possible bandwidth (MAXBW$_i$) 800 that a network interface 210 is capable of processing may be adjusted downward by multiplying a usage limit factor ULF$_i$/100 802 in a multiplier 804. Usage limit factor 802 is set by a media gateway operator to allow network interfaces 210 to operate at user-defined limited maximum bandwidth (MAXULBW$_i$) 806 that is less than the physical limits of the respective network interface 210 as described above. Adjusted MCACBW$_i$ 708 is subtracted from MAXULBW$_i$ 806 in subtractor 808 to determine an available bandwidth BW$_i$ 810 for the respective network interface 210. The required bandwidth 812 for a call is established as described above and a comparison is made to the available bandwidth 810 of one or more network interfaces 210 to determine if any network interface has adequate available bandwidth 810 to support the call. Responsive to the result being greater than or equal to zero, the call is admitted and assigned to the respective network interface 210 by control manager 202. Responsive to the result being less than zero, the call is rejected, i.e., the call is not assigned to the respective network interface 210 by control manager 202. In this case, other network interfaces 210 may be checked for available bandwidth.

Accordingly, the systems and methods described herein provide for better supported measurement-based call admission control decisions, which offers many benefits. For example, the quality of service for existing calls and newly admitted calls handled by media gateway 200 can be preserved because resources in media gateway 200 are less likely to be exceeded. Moreover, higher bandwidth utilization can be achieved on network interfaces 210 without fear of over committing bandwidth, which also results in better load balancing among multiple network interfaces 210.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for measurement-based call admission control in a media gateway, the method comprising:

(a) receiving, in the media gateway, a request for establishing a new voice-over-IP (VoIP) call in the media gateway, the request indicating a required bandwidth for the new VoIP call;

(b) determining, in the media gateway, a bandwidth utilization of at least one Internet protocol (IP) network interface of the media gateway for sending and receiving voice over IP packets in the media gateway, wherein the at least one network interface services a plurality of communication links; and (c) determining, in the media gateway and using the determined bandwidth utilization of the at least one network interface of the media gateway, whether to admit the new VoIP call to the media gateway according to a per-interface admission policy.

2. The method of claim 1 wherein the required bandwidth for the new VoIP call is indicated to the media gateway via call setup signaling from a media gateway controller.

3. The method of claim 1 wherein determining a bandwidth utilization of at least one IP network interface comprises:

(a) receiving a reported bandwidth usage from the at least one IP network interface;

(b) comparing the reported bandwidth usage from the at least one IP network interface to a previously reported bandwidth usage of the at least one IP network interface as adjusted by a decay factor; and (c) determining the bandwidth utilization to be a maximum one of the reported bandwidth usage and the previously reported bandwidth usage adjusted by the decay factor.

4. The method of claim 3 wherein determining a bandwidth utilization of at least one IP network interface further comprises adjusting the determined bandwidth utilization as new VoIP calls are admitted or existing VoIP calls are released.

5. The method of claim 1 wherein the per-interface admission policy is configurable.

6. The method of claim 1 wherein the per-interface admission policy is based on the determined required bandwidth for the new VoIP call and the determined bandwidth utilization for a respective one of the IP network interfaces.

7. The method of claim 6 wherein determining whether to admit the new VoIP call to the media gateway according to a per-interface admission policy comprises:

(a) determining a maximum bandwidth for the at least one IP network interface;

(b) subtracting the determined bandwidth utilization of the at least one IP network interface from the determined maximum IP network interface bandwidth to determine an available bandwidth for the at least one IP network interface; and (c) admitting the new VoIP call responsive to the available bandwidth for the at least one IP network interface being at least the required bandwidth for the VoIP call.

8. The method of claim 7 wherein determining a maximum IP network interface bandwidth comprises applying a usage limit factor to limit the maximum IP network interface bandwidth.

9. The method of claim 7 comprising, responsive to the available bandwidth for the at least one IP network interface not being greater than the required bandwidth for the VoIP call, repeating steps (b) and (c) for another IP network interface.

10. The method of claim 7 comprising, responsive to the available bandwidth for the at least one IP network interface not being greater than the required bandwidth for the VoIP call, rejecting the VoIP call.

11. A system for measurement-based call admission control in a media gateway, the system comprising:

(a) at least one network processor in the media gateway associated with at least one IP network interface in the media gateway, each network processor having logic configured to measure bandwidth utilization of its IP network interface, wherein the at least one network interface services a plurality of communication links; and (b) a control manager in the media gateway for receiving the measured bandwidth utilization for each of the network interfaces, for receiving a request for establishing a new voice-over-IP (VoIP) call in the media gateway and for determining, using the measured bandwidth utilization of the network interfaces of the media gateway, whether to admit the new VoIP call to the media gateway based on a per-interface admission policy.

12. The system of claim 11 wherein each network processor includes logic configured to report bandwidth usage of its respective IP network interface to the control manager.

13. The system of claim 11 wherein the control manager comprises logic configured to:

(a) receive a reported bandwidth usage from the at least one IP network interface;

(b) compare the reported bandwidth usage from the at least one IP network interface to a previously reported bandwidth usage of the at least one IP network interface as adjusted by a decay factor; and (c) determine the bandwidth utilization to be a maximum one of the reported bandwidth usage and the previously reported bandwidth usage adjusted by the decay factor.

14. The system of claim 13 wherein the control manager comprises logic configured to adjust the determined bandwidth utilization as new VoIP calls are admitted or existing VoIP calls are released.

15. The system of claim 11 wherein the control manager comprises logic configured to receive an indication of the bandwidth required for the new VoIP call from a media gateway controller during call setup signaling.

16. The system of claim 11 wherein the per-interface admission policy is configurable.

17. The system of claim 11 wherein the per-interface admission policy is based on the determined required bandwidth for the new VoIP call and the determined bandwidth utilization for a respective one of the IP network interfaces.

18. The system of claim 17 wherein the control manager comprises logic configured to:

(a) determine a maximum IP network interface bandwidth;

(b) subtract the determined bandwidth utilization of the IP network interface from the determined maximum IP network interface bandwidth to determine an available bandwidth for the IP network interface; and (c) admit the VoIP call responsive to the available bandwidth for the IP network interface being greater than the required bandwidth for the VoIP call.

19. The system of claim 18 wherein the control manager comprises logic configured to determine a maximum IP network interface bandwidth by applying a usage limit factor to limit the maximum IP network interface bandwidth.

20. The system of claim 18 wherein the control manager comprises logic configured to, responsive to the available bandwidth for the IP network interface not being greater than the required bandwidth for the VoIP call, admit the VoIP call to the media gateway based on bandwidth required for the new VoIP call and the bandwidth utilization measured for at least one other IP network interface of the media gateway.

21. The system of claim 18 wherein the control manager comprises logic configured to, responsive to the available bandwidth for the IP network interface not being greater than the required bandwidth for the VoIP call, reject the VoIP call.

22. A non-transitory computer-readable medium for measurement-based call admission control in a media gateway, the computer-readable medium comprising logic configured to:
 (a) determine, in the media gateway, a required bandwidth for a new VoIP call;
 (b) determine, in the media gateway, a bandwidth utilization of at least one Internet protocol (IP) network interface of the media gateway for sending and receiving voice over IP packets in the media gateway, wherein the at least one network interface services a plurality of communication links; and
 (c) determine, in the media gateway and using the bandwidth utilization determined for the at least one network interface of the media gateway, whether to admit the new VoIP call to the media gateway based on a per-interface admission policy.

23. The computer-readable medium of claim 22 wherein, to determine a bandwidth utilization of at least one IP network interface, the computer-readable medium includes logic configured to:
 (a) receive a reported bandwidth usage from the at least one IP network interface;
 (b) compare the reported bandwidth usage from the at least one IP network interface to a previously reported bandwidth usage of the at least one IP network interface as adjusted by a decay factor; and
 (c) determine the bandwidth utilization to be a maximum one of the reported bandwidth usage and the previously reported bandwidth usage adjusted by the decay factor.

24. The computer-readable medium of claim 23 comprising logic configured to adjust the determined bandwidth utilization as new VoIP calls are admitted or existing VoIP calls are released.

25. The computer-readable medium of claim 22 wherein the per-interface admission policy is configurable.

26. The computer-readable medium of claim 22 wherein the per-interface admission policy is based on the determined required bandwidth for the new VoIP call and the determined bandwidth utilization for a respective one of the IP network interfaces.

27. The computer-readable medium of claim 26 wherein, to determine whether to admit the new VoIP call to the media gateway based on a per-interface admission policy, the computer-readable medium comprises logic configured to:
 (a) determine a maximum IP network interface bandwidth;
 (b) subtract the determined bandwidth utilization of the IP network interface from the determined maximum IP network interface bandwidth to determine an available bandwidth for the IP network interface; and
 (c) admit the new VoIP call responsive to the available bandwidth for the IP network interface being at least the required bandwidth for the VoIP call.

28. The computer-readable medium of claim 27 wherein, to determine a maximum IP network interface bandwidth, the computer-readable medium comprises logic configured to apply a usage limit factor to limit the maximum IP network interface bandwidth.

29. The computer-readable medium of claim 27 comprising logic configured to, responsive to the available bandwidth for the IP network interface not being greater than the required bandwidth for the VoIP call, check available bandwidth in another IP network interface.

30. The computer-readable medium of claim 27 comprising logic configured to, responsive to the available bandwidth for the IP network interface not being greater than the required bandwidth for the VoIP call, reject the VoIP call.

* * * * *